Patented Jan. 5, 1937

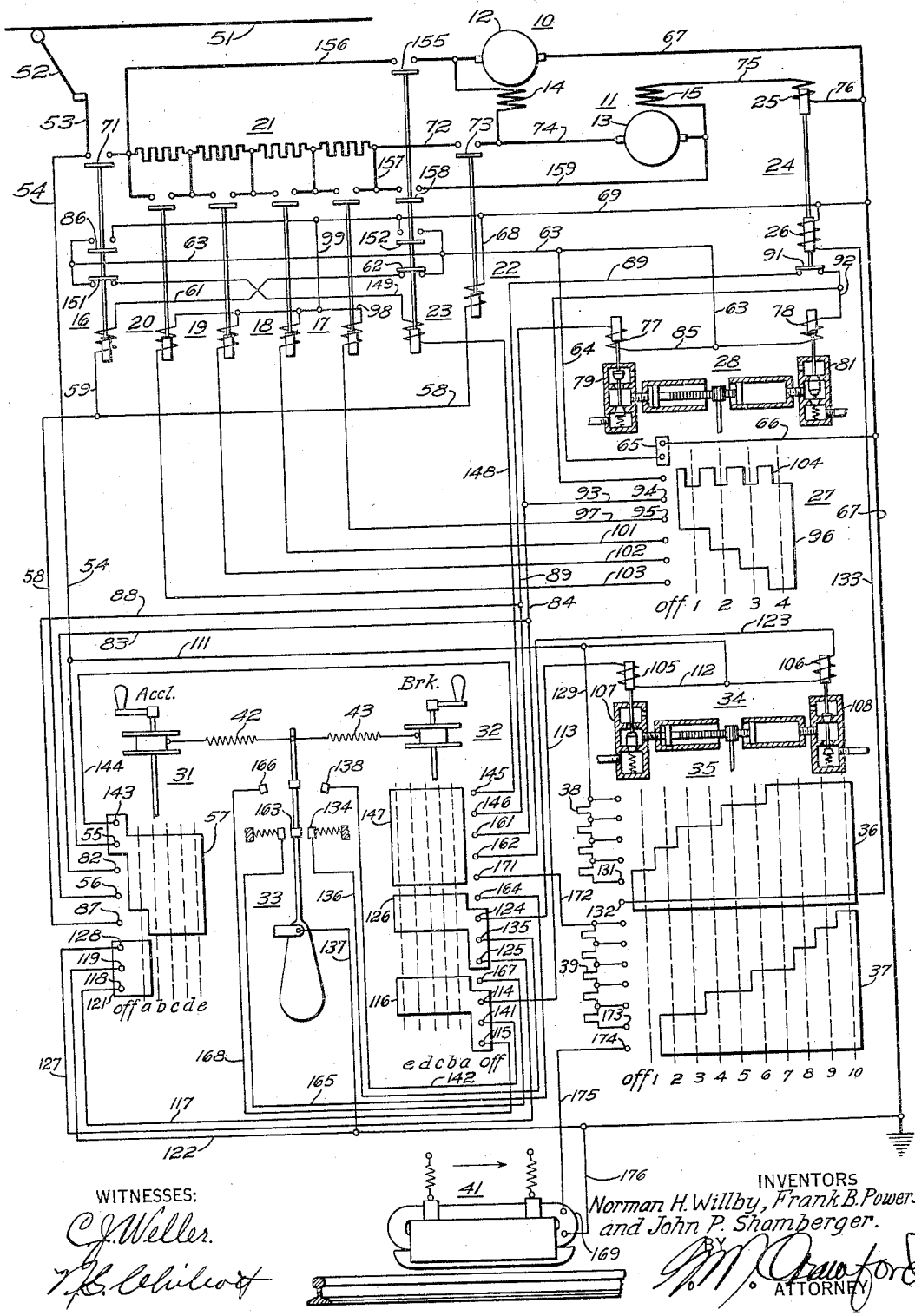

2,066,920

UNITED STATES PATENT OFFICE 2,066,920

CONTROL SYSTEM

Norman H. Willby, Irwin, Frank B. Powers and John P. Shamberger, Wilkinsburg, Pa., assignors to Westinghouse Electric & Manufacturing Company, East Pittsburgh, Pa., a corporation of Pennsylvania Application August 31, 1935, Serial No. 38,744

11 Claims. (Cl. 172—179)

Our invention relates, generally, to control systems, and, more particularly, to systems for automatically controlling the acceleration and the deceleration of electrically propelled vehicles.

In view of the lightweight construction of some of the modern street cars, there is a great difference between the total weight when loaded and the car weight when empty. Therefore, the rate of both acceleration and braking decreases rapidly as the passenger load increases, which is particularly undesirable since the highest rates of acceleration and braking are needed when the load is heaviest.

An object of our invention is to maintain predetermined rates of acceleration and retardation of an electric vehicle irrespective of the load carried by the vehicle.

Another object of our invention is to provide for selective acceleration and retardation of an electrically propelled vehicle.

A more general object of our invention is to provide an automatic control system which shall be simple and efficient in operation and which may be economically manufactured and installed.

Other objects of our invention will be fully explained hereinafter or will be apparent to those skilled in the art.

In accordance with one embodiment of our invention, both the acceleration and the retardation of an electric vehicle are governed by a pendulum device which functions to cause preselected rates of acceleration and deceleration to be maintained irrespective of the load on the vehicle. Provision is made for preselecting the rates of acceleration and deceleration by controllers which are operated by the vehicle operator and are connected to the pendulum device by variable loading springs. The pendulum device governs the operation of the control equipment, including a magnetic track brake, thereby controlling the acceleration and the deceleration of the vehicle.

For a fuller understanding of the nature and objects of our invention, reference may be had to the following detailed description, taken in conjunction with the accompanying drawing, in which the single figure is a diagrammatic view of a control system embodying our invention.

Referring to the drawing, the system shown comprises motors 10 and 11 having armature windings 12 and 13 and series field windings 14 and 15, respectively; a line switch 16, a plurality of accelerating switches 17, 18, 19 and 20 for shunting a resistor 21 from the motor circuit to accelerate the motors 10 and 11; an additional switch 22 for completing the motor circuit during acceleration of the motors; a braking switch 23 for establishing dynamic braking connections for the motors; a current limit relay 24 having an actuating coil 25 and a loading coil 26 disposed to oppose the actuating coil 25; a sequence switch or drum 27 driven by an air engine 28 for controlling the operation of the resistor shunting switches 17 to 20, inclusive; an accelerating controller 31 and a braking controller 32 which are both of the drum type, well known in the art. As shown, the controllers 31 and 32 are electrically interlocked, however, they may be also mechanically interlocked to prevent improper operation of the controllers and the equipment controlled thereby.

As fully described in Patent No. 1,894,971, issued January 24, 1933, to B. O. Austin et al., and assigned to the Westinghouse Electric & Manufacturing Company, the foregoing apparatus may be utilized to control both the acceleration and the retardation of an electrically propelled vehicle and to provide for variable rates of acceleration and deceleration, which may be selected by the operator to meet varying traffic conditions. However, the system described in the foregoing patent does not provide for maintaining constant rates of acceleration and deceleration irrespective of the load on the vehicle, which, as explained hereinbefore, is desirable and necessary in view of the lightweight construction of modern street cars.

In order that constant preselected rates of acceleration and deceleration may be maintained irrespective of the load on the vehicle, a pendulum device 33 is so mounted on the vehicle that it is responsive to the rates of acceleration and deceleration of the vehicle. The pendulum device 33 is disposed to control the operation of an air engine 34, which drives a drum switch 35 having contact segments 36 and 37. The contact segment 36 is utilized for shunting a resistor 38 from the circuit for the loading coil 26 of the limit relay 24, thereby varying the current in the loading coil 26 and governing the operation of the limit relay. The contact segment 37 is disposed to shunt a resistor 39, step-by-step, from the circuit for the electromagnet of a magnetic track brake 41, which is utilized to assist in retarding the vehicle in a manner which will be more fully described hereinafter.

With a view to permitting the operator of the vehicle to select the rates of acceleration and deceleration which he desires to maintain, springs 42 and 43 are so connected between the pendulum device 33 and the controllers 31 and 32, respectively, that the tension of the springs may be increased by operating the controllers, thereby governing the operation of the pendulum device 33 to increase or decrease the rates of acceleration and deceleration, which will be automatically maintained by the control system herein described.

In order that the functioning of the foregoing apparatus may be more clearly understood, the operation of the system will now be described in more detail. Assuming that it is desired to operate the vehicle in the direction indicated by the arrow shown above the track brake 41, the controller 31 may be actuated to a position "a", thereby closing the line switch 16 and the switch 22 to connect the motors 10 and 11 to a power conductor 51. The energizing circuit for the actuating coil of the switch 16 may be traced from the power conductor 51, through a trolley 52, conductors 53 and 54, contact fingers 55 and 56 bridged by a contact segment 57 of the controller 31, conductors 58 and 59, the actuating coil of the switch 16, conductor 61, an interlock 62 on the braking switch 23, which must be in the open position, conductors 63 and 64, a contact segment 65 on the sequence drum 27 which is in the "off" position, and conductor 66 to the grounded conductor 67. The energizing circuit for the switch 22 extends from the previously energized conductor 58 through the actuating coil of the switch 22 and conductors 68 and 69 to the grounded conductor 67.

The motors 10 and 11 are now connected in parallel-circuit relation and are connected to the power conductor 51 in series with the resistor 21. The circuit for the motor 10 may be traced from the power conductor 51, through the trolley 52, conductor 53, contact member 71 of the line switch 16, the resistor 21, conductor 72, contact members 73 of the switch 22, the series field winding 14, and the armature winding 12 of the motor 10 to the grounded conductor 67. The circuit for the motor 11 extends from the switch 22 through conductor 74, the armature winding 13 and series field winding 15 of the motor 11, conductor 75, the actuating coil 25 of the limit relay 24 and conductor 76 to the grounded conductor 67.

Since all of the resistor 21 is connected in series with the motors 10 and 11, the motors will operate at a low rate of speed. If it is desired to accelerate the motors, the controller 31 may be actuated to position "b" which will cause the air engine 28 to operate the sequence switch 27 through positions 1 to 4, inclusive, to close the resistor shunting switches 17 to 20 in sequential relation, thereby accelerating the motors 10 and 11 in a manner well known in the art.

The air engine 28 is so constructed that it will advance the sequence switch or drum 27 when the actuating coils 77 and 78 of magnet valves 79 and 81, respectively, are both energized. The energizing circuit for the actuating coil 77 may be traced from a contact finger 82, which engages the contact segment 57 of the controller 31, through conductors 83 and 84, the actuating coil 77, conductors 85 and 63, an interlock 86 on the line switch 16, which also functions to establish a holding circuit for the switch 16, and conductor 69 to the grounded conductor 67. The circuit for the actuating coil of the magnet valve 81 may be traced from a contact finger 87, which engages the contact segment 57, through conductors 88 and 89, contact member 91 on the limit relay 24, conductor 92, the actuating coil 78 and thence to the grounded conductors 67 through the circuit just previously traced for the coil 77.

As the sequence drum 27 is advanced through positions 1 to 4, the actuating coil of the switches 17 to 20, inclusive, are energized in sequential relation. The energizing circuit for the switch 17 may be traced from the previously energized conductor 84 through conductor 93, contact fingers 94 and 95 bridged by contact segment 96 of the drum switch 27, conductor 97, the actuating coil of the switch 17 and conductors 98, 99 and 69 to the grounded conductor 67. It will be seen that conductors 101, 102 and 103 are energized to operate the switches 18, 19 and 20, respectively, in a similar manner as the sequence switch 27 advances step-by-step.

However, as is fully explained in the foregoing Patent No. 1,894,971, the advancement of the sequence switch 27 by the air engine 28 is automatically controlled by the limit relay 24, which is responsive to the motor current, thereby preventing the sequence switch 27 from being advanced so rapidly that the motor current is excessive. It will be understood that the motor current is increased as each step of the resistor 21 is shunted from the motor circuit. The increase in the motor current causes the relay 24 to be operated to its uppermost position, thereby deenergizing the actuating coil of the magnet valve 81 which stops the advancement of the sequence switch 27. As the motors accelerate in speed, their counter-electromotive force is increased, thereby reducing the motor current which permits the limit relay 24 to drop to its lowermost position to energize the actuating coil of the magnet valve 81 and cause the sequence drum to advance to another position. It will be observed that the sequence drum 27 is provided with carryover contact segments 104 to prevent the stopping of the sequence drum 27 between positions by the deenergization of the magnet coil 78 as a result of the operation of the limit relay 24.

As described in the foregoing Patent No. 1,894,971, the operation of the limit relay 24 and, therefore, the rate of acceleration of the motors 10 and 11 may be governed by varying the current in the circuit for the loading coil 26 which is disposed to oppose the actuating coil 25 of the limit relay. By increasing the current in the loading coil 26, the amount of current required to operate the relay 24 is increased, which permits the motor current to be increased, thereby increasing the rate of acceleration of the motors.

As stated hereinbefore, the pendulum device 33 is utilized to control the operation of an air-operated drum switch 35 which shunts the resistor 38, step-by-step, from the circuit of the loading coil 26, thereby governing the operation of the limit relay 24. The air engine 34, which drives the drum switch 35, is so constructed that the drum switch 35 is held in the "off" position when the actuating coils 105 and 106 of the magnet valves 107 and 108, respectively, are both energized.

As shown, the magnet coils 105 and 106 were energized so long as the controller 31 was in the "off" position. The energizing circuit for the magnet coil 105 may be traced from the previously energized conductor 54 through conductors 111 and 112, the magnet coil 105, conductor 113, contact fingers 114 and 115 bridged by contact segment 116 on the braking controller 32, conductor 117, contact fingers 118 and 119 bridged by a contact segment 121 on the controller 31 and conductor 122 to the grounded conductor 67. The energizing circuit for the magnet coil 106 extends from the previously energized conductor 112 through the coil 106, conductor 123, contact fingers 124 and 125 bridged by contact segment 126, conductor 127, contact fingers 128 and 119 bridged by the contact segment 121 and conductor 122 to the grounded conductor 67.

However, when the accelerating controller 31 is actuated to position "b", as has been previously assumed, the magnet coils 105 and 106 are both deenergized and the drum switch 35 is advanced, first to energize the loading coil 26 by connecting it across the power source in series with the resistor 38 and then to shunt the resistor 38 from the loading coil circuit, thereby increasing the current in the loading coil. The circuit for the loading coil 26 may be traced from the previously energized conductor 111 through conductor 129, the resistor 38, contact fingers 131 and 132 bridged by the contact segment 36, conductor 133, the loading coil 26 and conductor 69 to the grounded conductor 67.

Assuming that the vehicle is moving in the direction indicated by the arrow above the track brake 41, it will be understood that the acceleration of the vehicle will cause the pendulum device 33 to swing in a direction to engage a resiliently mounted contact member 134 which establishes an energizing circuit for the magnet coil 106, thereby stopping the travel of the drum switch 35 which regulates the current in the loading coil 26 and governs the operation of the limit relay 24 which, in turn, regulates the rate of acceleration of the motors 10 and 11. The energizing circuit for the magnet coil 106 established by the pendulum device 33 may be traced from the previously energized conductor 112 through the magnet coil 106, conductor 123, contact fingers 124 and 135, bridged by the contact segment 126 on the controller 32, conductor 136, contact members 134 on the pendulum device 33, and conductors 137 and 122 to the grounded conductor 67.

If the vehicle is accelerating at such a rate that the pendulum device 33 swings to a position in which its contact members 138 are closed, an energizing circuit is established for the magnet coil 105 which causes the air engine 34 to return the drum switch 35 toward the "off" position, thereby increasing the resistance in the circuit for the loading coil of the relay 26 and reducing the rate of acceleration of the motors by decreasing the motor current required to operate the limit relay 24, which, in turn, governs the operation of the sequence switch 27 as hereinbefore explained.

The energizing circuit for the magnet coil 105 may be traced from the previously energized conductor 112 through the coil 105, conductor 113, contact fingers 114 and 141 bridged by the contact segment 116, conductor 142, contact members 138 on the pendulum device 33, and conductors 137 and 122 to the grounded conductor 67. In this manner, the pendulum device 33 functions to govern the rate of acceleration of the vehicle and to maintain the preselected rate of acceleration irrespective of the load carried by the vehicle.

It will be seen that the tension of the spring 42 is controlled by means of the accelerating controller 31, which is manually operated by the operator of the vehicle. Therefore, the movement of the pendulum device 33 may be governed by the operator, who may thereby select the rate at which he desires the vehicle to accelerate. Thus, by actuating the controller 31 to positions "d", or "e", a higher rate of acceleration is obtained than when the controller is on positions "b" or "c", since the tension of the spring 42 is increased which increases the loading on the pendulum device 33.

It will be understood that the pendulum device 33 functions to maintain the preselected rate of acceleration irrespective of the load carried by the vehicle, since the movement is entirely dependent upon the rate of acceleration of the vehicle. Therefore, if the accelerating controller 31 is actuated to position "e" for the maximum rate of acceleration, the pendulum device 33 will not function to stop the progression of the drum switch 35 until the preselected rate for acceleration is attained. Therefore, the drum switch will advance to permit the maximum current in the loading coil 26 which so governs the operation of the limit relay 24 that the sequence switch 27 will advance at its maximum rate which in turn will cause maximum acceleration of the motors 10 and 11. However, should the vehicle accelerate at a rate above that selected by the operator, the drum switch 35 is returned to a position which will provide the desired rate of acceleration, as hereinbefore explained.

The control system herein described will also automatically control the rate of deceleration or retardation of the vehicle in a manner similar to that of controlling the rate of acceleration. Provision is made for retarding the vehicle both by a dynamic brake and also by means of a magnetic track brake 41 which is coordinated with the dynamic braking of the motors 10 and 11.

Dynamic braking may be established by first actuating the controller 31 to the "off" position and then actuating the braking controller 32 to either one of the braking positions, "a", "b", "c", "d", or "e", the rate of retardation being controlled by the position of the controller 32.

When the braking controller 32 is actuated to position "a", the switch 23 is closed to establish dynamic braking connections for the motors 10 and 11. The energizing circuit of the loading coil of the switch 23 may be traced from the positive conductor 54 through contact members 55 and 143 bridged by the contact segment 57 on the controller 31, conductor 144, contact members 145 and 146 bridged by a contact segment 147 on the controller 32, conductor 148, the actuating coil 23, conductor 149, an interlock 151 on the switch 16, conductors 63 and 64, contact segment 65 on the sequence switch 27, which was returned to the "off" position when the controller 31 was actuated to the "off" position, and conductor 66 to the grounded conductor 67. A holding circuit is established for the actuating coil of the switch 23 through its contact members 152 when the switch is closed.

The closing of the switch 23 establishes dynamic braking connections for the motors 10 and 11 in a manner well known in the art, the resistor 21 being so connected in the motor circuit that the motor current may be controlled by shunting the resistor by means of the switches 17 to 29, inclusive, in the same manner as during the acceleration of the motors. The motors 10 and 11 are so connected that the field winding 14 of the motor 10 is in series with the armature winding 13 of the motor 11, and the field winding 15 is in series with the armature winding 12 of the motor 10, thereby permitting the current to flow through the field windings in the same direction as during acceleration and through the armature windings in the reverse direction, which causes the motors to act as generators to retard the movement of the vehicle. The circuit through the field winding 14 may be traced from one side of the armature 13, conductor 74, field winding 14, contact members 155 on the switch 23, conductor 156, the resistor 21, conductor 157, contact members 158 on switch 23, and conductor 159 to the other side of the armature 13. The circuit through the field winding 15 may be traced from one side of the armature winding 12 of the motor 10 through the contact members 155 on the switch 23, conductor 156, resistor 21, conductor 157, contact members 158, conductor 159, the field winding 15, conductor 75, the actuating coil 25 of the relay 24 and conductors 76 and 67 to the other side of the armature winding 12.

It will be observed that the magnet coils 77 and 78 of the air engine 28 are energized through circuits established by the contact fingers 161 and 162 which engage the contact segment 147 on the controller 32, thereby causing the sequence switch 27 to be advanced under the control of the limit relay 24, as hereinbefore explained, to shunt the resistor 21 from the motor circuit by means of the switches 17 to 20, inclusive, which are actuated in sequential relation. The pendulum device 33 functions to maintain a predetermined rate of deceleration by controlling the operation of the drum switch 35, which in turn governs the operation of the limit relay 24. The magnet coils 105 and 106 were both deenergized when the controller 32 was actuated from its "off" position, thereby causing the drum switch 35 to be advanced to shunt the resistor 38 from the circuit for the loading coil 26, as has been described hereinbefore.

If the rate of deceleration is such that the pendulum device 33 swings to a position in which its contact members 163 are closed, the magnet coil 106 is energized to stop the progression of the drum switch 35. The circuit through the magnet coil 106 may be traced from the previously energized conductor 112 through the coil 106, conductor 123, contact fingers 124 and 164, bridged by contact segment 126, conductor 165, contact members 163 on the pendulum device 33 and conductors 131 and 122 to the grounded conductor 67.

If the rate of deceleration is still further increased, the pendulum device 33 will swing to a position in which its contact members 166 are closed, thereby energizing the magnet coil 105 through a circuit which extends from the conductor 112 through the coil 105, conductor 113, contact fingers 114 and 167, conductor 168, contact members 166 on the pendulum device 33 and conductors 131 and 122 to the grounded conductor 67, which causes the drum switch 35 to be returned toward its "off" position. In this manner, the pendulum device 33 functions to maintain the preselected rate of deceleration by controlling the motor current as herein described.

In addition to controlling the motor current during dynamic braking of the motors, the pendulum device 33 also controls the energization and, therefore, the braking effect of the magnetic track brake 41, thereby causing the track brake to cooperate with the motors 10 and 11 in controlling the retardation of the vehicle. The electro-magnet 169 of the magnetic track brake 41 is energized through a circuit which may be traced from contact finger 171 which engages the segment 147 on the controller 32 through conductor 172, resistor 39, contact fingers 173 and 174 bridged by the contact segment 37, conductor 175, the electromagnet 169 and conductors 176 and 122 to the ground conductor 67.

It will be seen that the resistor 39 is shunted from the circuit for the electromagnet 169 as the drum switch 35 is advanced by the air engine 34. Since the operation of the air engine 34 is governed by the pendulum device 33, as herein explained, the effect of the track brake 41 is controlled by the pendulum device 33, and the track brake 41, therefore, cooperates with the motors 10 and 11 to control the retardation of the vehicle. In a similar manner the pendulum device 33 and the drum switch 35 may be utilized to coordinate air brakes with the dynamic brake to provide the desired braking effect.

It will be understood that the rate of deceleration may be increased by actuating the controller 32 toward position "e", which permits the operator to select the desired rate of deceleration in the same manner as the rate of acceleration of the vehicle. The tension of the spring 43 is increased as the braking controller 32 is actuated toward position "e", thereby controlling the movement of the pendulum device 33, which functions to maintain the preselected rate of deceleration, as herein described.

From the foregoing description, it will be apparent that we have provided a control system which will automatically govern both the acceleration and the deceleration or retardation of an electrically propelled vehicle and which will function to maintain the preselected rates of acceleration and deceleration irrespective of the load carried by the vehicle. The system herein described permits the operator of the vehicle to select the rates of acceleration and deceleration which are most suitable for the traffic conditions encountered, and provides for maintaining the selected rate.

Since numerous changes may be made in the above-described construction and different embodiments of the invention may be made without departing from the spirit and scope thereof, it is contended that all matter contained in the above description or shown in the accompanying drawing shall be determined as illustrative and not in a limiting sense.

We claim as our invention:

1. In a motor control system, in combination, an electric motor for propelling a vehicle, manually-operable means for controlling the motor connections, means for controlling the acceleration of the motor, means actuated in accordance with the amount of motor current for controlling the operation of the acceleration-controlling means, means responsive to the rate of acceleration of the vehicle for governing the operation of the current-responsive means, and means adjusted by said manually-operable means for governing the operation of the last-named means to vary the rate of acceleration of the vehicle.

2. In a motor control system, in combination, an electric motor for propelling a vehicle, a manually-operable controller, switching means for controlling the acceleration of the motor, means for controlling the operation of the switching means in accordance with the motor current, means responsive to the rate of acceleration of the vehicle for governing the operation of the current-responsive means, and means associated with said controller for governing the operation of the last-named means.

3. In a motor control system, in combination, an electric motor for propelling a vehicle, a manually-operable controller, switching means for controlling the acceleration of the motor, means responsive to the motor current for controlling the operation of the switching means, means responsive to the rate of acceleration of the vehicle for governing the operation of the current-responsive means, and means actuated by said controller for governing the operation of the last-named means.

4. In a motor control system, in combination, an electric motor for propelling a vehicle, a manually-operable controller, switching means for controlling the acceleration of the motor, relay means responsive to the motor current for controlling the operation of the switching means, means for varying the current required to operate said relay means, means responsive to the rate of acceleration of the vehicle for controlling the operation of said current-varying means, and means associated with said controller for governing the operation of the last-named means.

5. In a motor control system, in combination, an electric motor for propelling a vehicle, a manually-operable controller, switching means for controlling the acceleration of the motor, relay means responsive to the motor current for controlling the operation of the switching means, means for varying the current required to operate said relay means, means responsive to the rate of acceleration of the vehicle for controlling the operation of said current-varying means, and spring means biased by said controller for governing the operation of the last-named means.

6. In a motor control system, in combination, an electric motor for propelling a vehicle, a manually-operable controller, switching means for controlling the acceleration of the motor, relay means for controlling the operation of the switching means in accordance with the motor current, said relay means having an actuating coil and a loading coil disposed to oppose the actuating coil, means for varying the current in the loading coil, means responsive to the rate of acceleration of the vehicle for controlling the operation of said current-varying means, and means actuated by said controller for governing the operation of the last-named means.

7. In a motor control system, in combination, a plurality of electric motors for propelling a vehicle, a manually-operable controller, means for establishing dynamic braking connections for the motors to decelerate the vehicle, switching means for controlling the deceleration of the motors, means responsive to the motor current for controlling the operation of the switching means, means responsive to the rate of deceleration of the vehicle for governing the operation of the current-responsive means, and spring means biased by said controller for governing the operation of the last-named means.

8. In a motor control system, in combination, a plurality of electric motors for propelling a vehicle, a manually-operable controller, means for establishing dynamic braking connections for the motors to decelerate the vehicle, switching means for controlling the deceleration of the motors, means for controlling the operation of the switching means in accordance with the motor current, means responsive to the rate of deceleration of the vehicle for governing the operation of the current-responsive means, and means associated with said controller for governing the operation of the last-named means.

9. In a motor control system, in combination, a plurality of electric motors for propelling a vehicle, means for connecting the motors to a power source to accelerate the vehicle, means for establishing electrical braking connections for the motors to decelerate the vehicle, additional means for braking the vehicle, switching means for controlling the acceleration and the deceleration of the motors, means for controlling the operation of the switching means in accordance with motor current, and means responsive to the rates of acceleration and deceleration of the vehicle for governing the operation of said control means and said additional braking means.

10. In a motor control system, in combination, a plurality of electric motors for propelling a vehicle, means for connecting the motors to a power source to accelerate the vehicle, means for establishing electrical braking connections for the motors to decelerate the vehicle, additional means for braking the vehicle, switching means for controlling the acceleration and the deceleration of the motors, means responsive to the motor current for controlling the operation of the switching means, means responsive to the rates of acceleration and deceleration of the vehicle for governing the operation of the current-responsive means and said additional braking means, and means for governing the operation of the last-named means to vary the rates of acceleration and deceleration of the vehicle.

11. In a motor control system, in combination, a plurality of electric motors for propelling a vehicle, means for connecting the motors to a power source to accelerate the vehicle, means for establishing electrical braking connections for the motors to decelerate the vehicle, switching means for controlling the acceleration and the deceleration of the motors, means responsive to the motor current for controlling the operation of the switching means, means responsive to the rates of acceleration and deceleration of the vehicle for governing the operation of the current-responsive means, and means cooperating with the last-named means to control the operation of additional braking means for the vehicle.

NORMAN H. WILLBY.
FRANK B. POWERS.
JOHN P. SHAMBERGER.